Sept. 20, 1966  J. L. GOLDMAN  3,273,527
INTEGRATED BARGE AND CARGO SHIP CONSTRUCTION
Filed Dec. 28, 1964  3 Sheets-Sheet 2

INVENTOR
Jerome L. Goldman

BY Wilkinson, Mawhinney & Theibault
ATTORNEYS

INVENTOR
Jerome L. Goldman

United States Patent Office 3,273,527
Patented Sept. 20, 1966

3,273,527
INTEGRATED BARGE AND CARGO SHIP
CONSTRUCTION
Jerome L. Goldman, 1420 N.B.C. Bldg., New Orleans, La.
Filed Dec. 28, 1964, Ser. No. 421,237
3 Claims. (Cl. 114—43.5)

The present invention relates to integrated barge and cargo ship construction and has for an object to provide a new hold construction of a cargo vessel divided into a multiplicity of cargo receiving holds from forward-aft which cargo holds are of a length with respect to the forward-aft dimension of the ship to receive stacked tiers of barges which barges are disposed in the cargo hold with the forward-aft axis of the barge being athwart ship of the main cargo ship hull.

A still further object of the present invention is the provision of a cargo vessel for receiving high-capacity barges capable of carrying large amounts of cargo which barges may be quickly loaded on to and removed from the ship to permit the ship to operate with a minimum of in-port or in-harbor time.

A still further object of the present invention is the provision of a cargo hull construction in which a traveling crane straddles the cargo hold area traveling from the forward most hold to a stern barge off-loading well which crane will only pick up the barge and travel with it and which will not re-orient the axis of the barge relative to the main axis of the hold of the cargo ship and which will not require a side-ways traversing unit laterally to the side of the ship.

The prior art construction of this type vessel as shown in the R. E. Mooneyhan et al., U.S. Letters Patent No. 2,988,036, while relating to a barge cargo ship has embodied an entirely different physical principle for disposing the barges relative to the axis of the ship and transferring the barges from the cargo hold to the loading cargo stations of the ship. There is no provision in the above identified prior art construction for protecting or storing the barges one upon another without crushing the barges and cargo or for providing uninterrupted barge storing space in the holds while still not taking away from the water-tight integrity of the ship.

The Lovfald U.S. Letters Patent No. 2,363,797, while showing cargo being transported in transportation unit loads, in this instance traveler units, the present invention eliminates all of the extra cranes and decking necessary in a vessel to so handle such pre-packed units.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
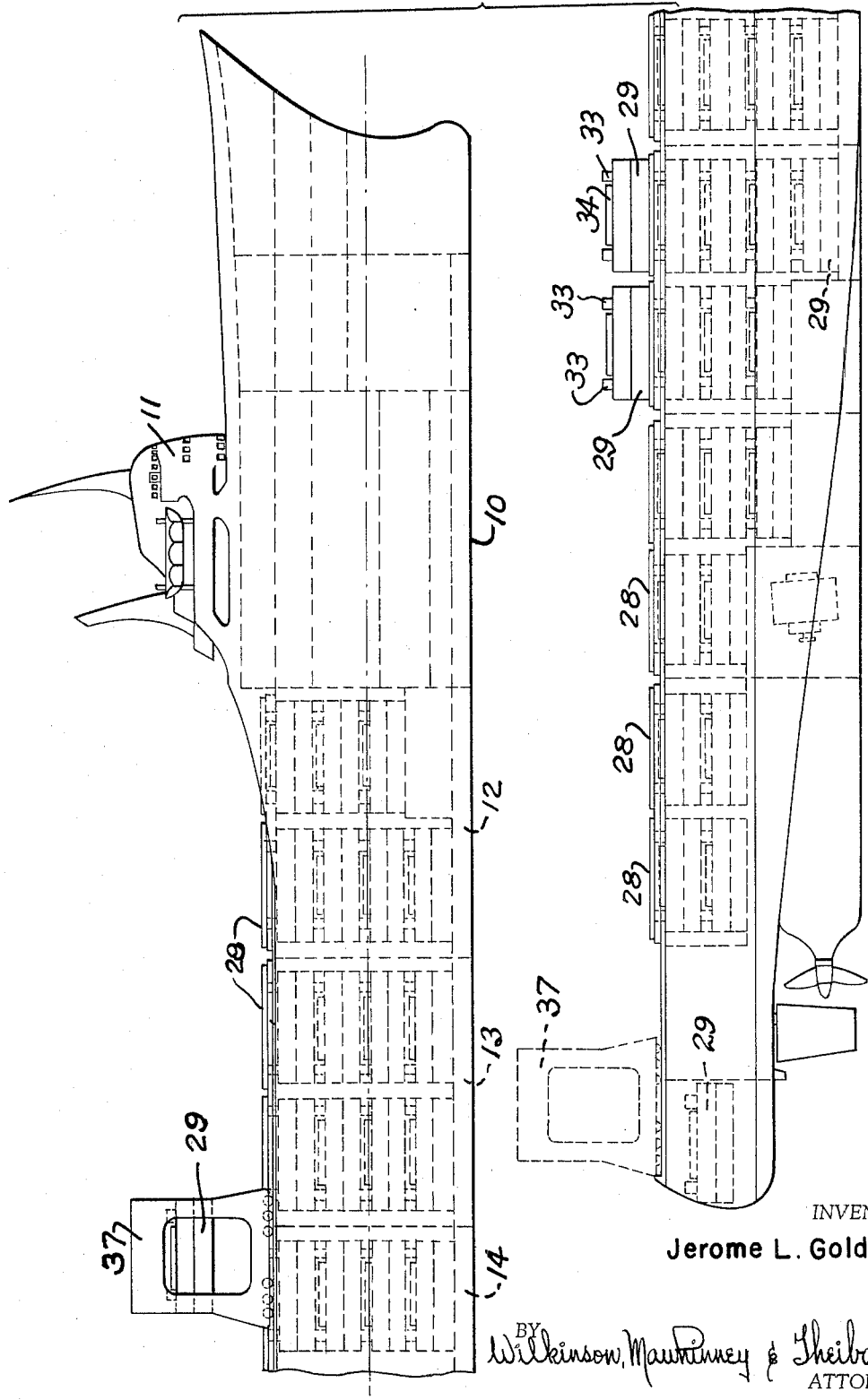
FIGURE 1 is a side elevational view of a cargo vessel and barge construction constructed in accordance with the present invention with barges shown in dotted and solid lines.
Figure 3:
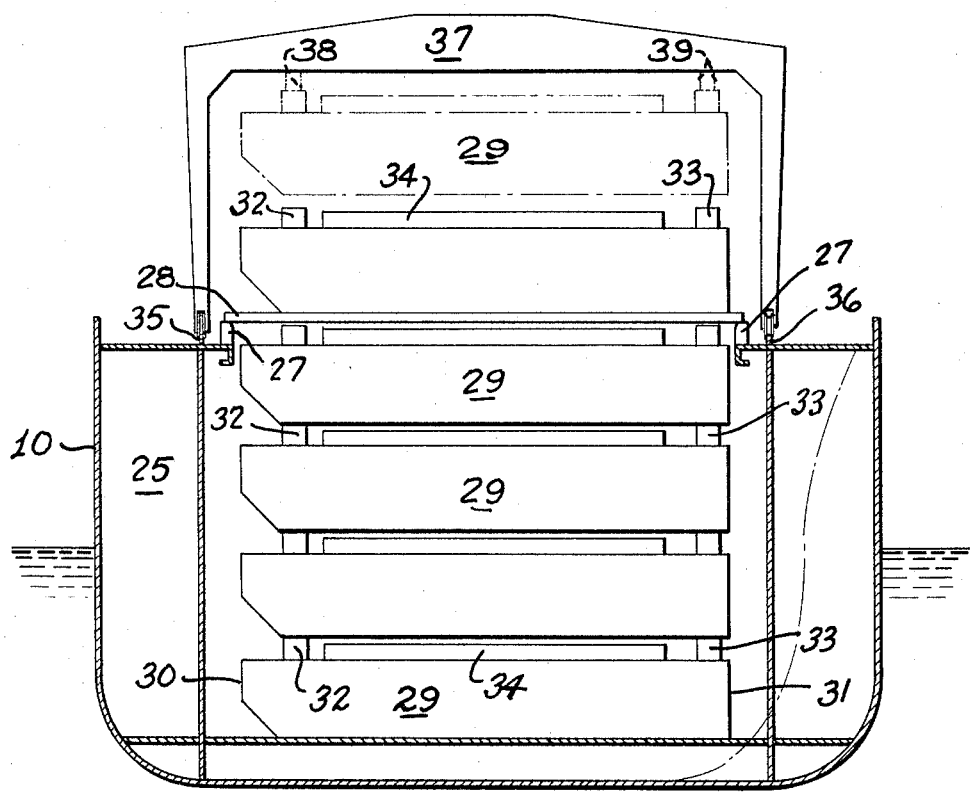
FIGURE 3 is a transverse section taken through the vessel of FIGURES 1 and 2 through a cargo hold of the vessel with barges loaded thereon.

Referring more particularly to the drawings, the upper portion of FIGURE 1 shows the forward end of the cargo ship having a hull 10 with a wheel house 11 at the forward end and in the aft part of the ship, that is after of the wheel house, the vessel is divided into cargo holds 12, 13, 14, 15, 16 and 17. Between each of the cargo holds thus defined are water-tight bulkheads 18, 19, 20, 21, 22 and 23. Each of the cargo holds is uninterrupted, as best seen in FIGURE 3 from the inner wall of the wing tank 24 to the inner wall of wing tank 25. The vessel is provided with a main deck 26 having coaming about a hatch area 27 for receiving a hatch cover 28 over each hold.

Figure 2:
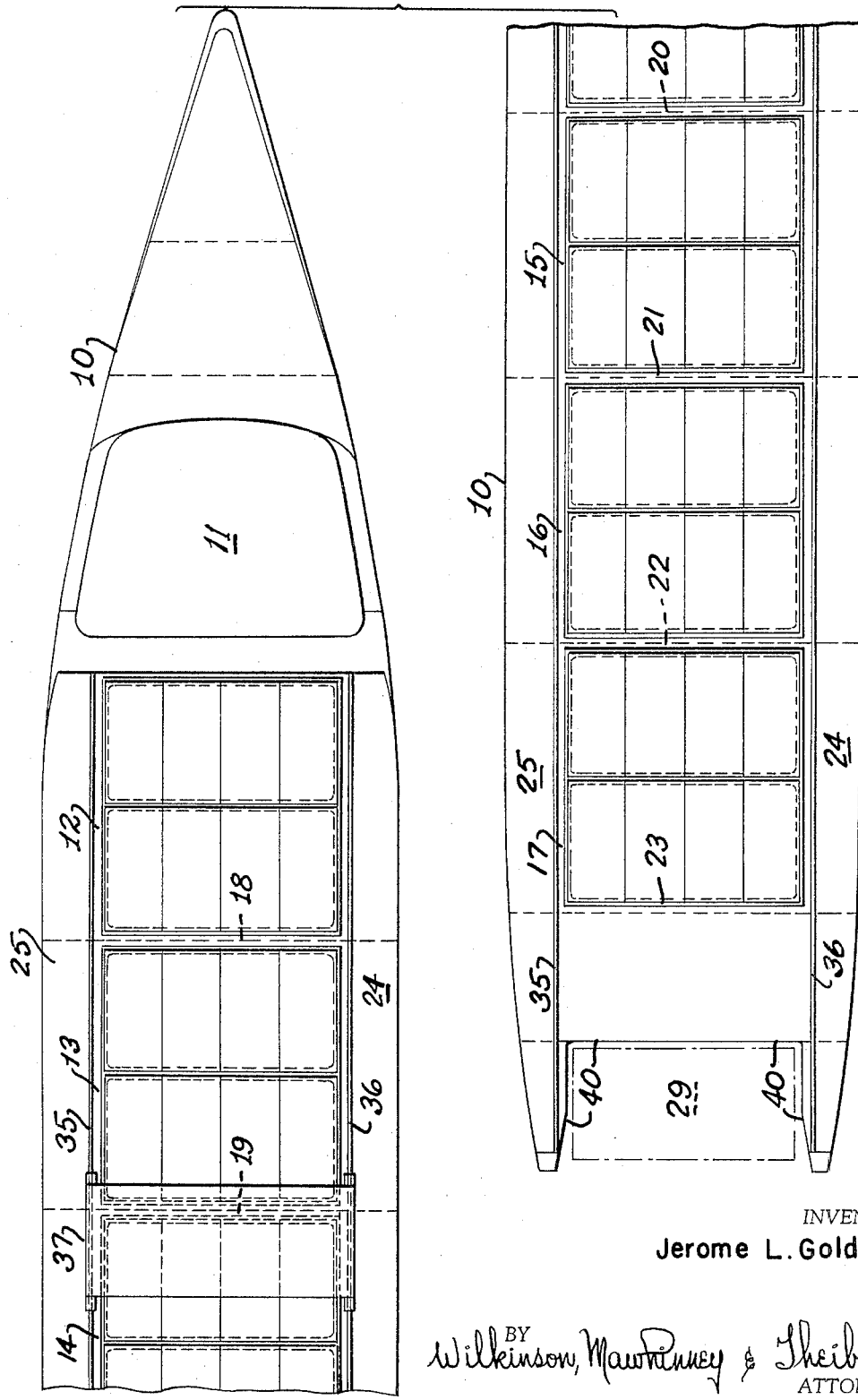
FIGURE 2 is a top-plan view of the vessel of FIGURE 1.

The cargo unit or barges 29 have a bow 30 and stern 31. Each barge has a set of spaced apart pair of pillars 32 proximate to the bow and a pair of pillars at its stern 33. The cargo carried by the barges 29 is shown at 34. It will be noted in FIGURE 3 that the bottom of the barges above the first one stored in the vessel rests upon the pillars of the barge immediately beneath it to prohibit crushing the cargo stacked upon in the form of other loaded barges. As best shown in FIGURES 1 and 2, the barges 29 are positioned in the cargo-receiving hold with their major axis at right angles to the longitudinal axis of the main cargo ship 10. This orientation of the barge unit with respect to the main vessel hold permits larger capacity holding of larger barges for quicker off-loading than as heretofore been suggested in the prior art.

Running forward aft, as best seen in FIGURE 3, on top of the main deck are rails 35, 36 over which travels a crane 37, which straddles the cargo holds and which is equipped with pick-up hoists 38, 39 for lifting a barge 29 from the hold as shown in dotted lines in FIGURE 3 and for transporting the barge to the stern of the vessel which, as shown in FIGURE 2, is provided with a cut-away barge-transfer well 40 defined on two ends by hull continuations and one one side by the stern of the vessel to permit the crane 37 to discharge the barges at which time they are picked up and taken in tow by a tug for moving the same into a harbor area or for further transport up a river which may not be navigable by the larger ship itself.

The barge units 29 may be loaded at any port and by tug taken out to the open water or harbor where the tug will place the barge in the barge-transfer well 40 of the main vessel hull 10 at which time the crane 37 will pick-up the barge elevating it to clear the main deck and any other barge deck cargo which may be present as shown in FIGURES 1 and 3, at which time the crane 37 will travel along the rails 35, 36 with the barge and lower it into its stored position with the fore-aft axis of the barge athwart ship of the main vessel hull 10.

A large number of barges carrying many tons or units of cargo may be on- or off-loaded in a minimum of time requiring a minimum of handling.

Although I have disclosed herein the best forms of the invention known to me at this time, I reserve the right to all such modifications and changes as may come within the scope of the following claims.

What is claimed is:

1. A cargo ship for carrying cargo loaded in barges for quick loading and unloading comprising
    (a) a main hull having cargo hold areas along the longitudinal axis thereof;
    (b) the stern of said hull having beam width continuations above the water line forming with the stern of said hull an open-ended barge transfer well;
    (c) the cargo hold areas being of a size along the fore and aft axis of the hull to receive two tiers of cargo barges with the fore and aft axis of the barges athwart ship of the main hull;
    (d) and a barge transfer crane astride of the cargo hold areas and movable along the longitudinal axis of the hull from the cargo area closest the bow of the main hull to and onto said hull continuations so that the crane is above said barge transfer well;
    (e) and cargo barges receivable by said crane with the fore and aft axis of the barges transversely of the longitudinal axis of the hull.

2. A cargo ship and barge construction as claimed in claim 1 wherein the barges have a bow and stern with two support pillars proximate the bow and two support pillars proximate the stern so that barges may be stacked one upon another without danger of crushing cargo contained therein.

3. A cargo ship and barge construction as claimed in claim 1 wherein said cargo hold area is uninterrupted and open from the inner bulkhead of the starboard wing tank to the inner bulkhead of the port wing tank and from the bottom of the hold to the main deck.

No references cited.

MILTON BUCHLER, *Primary Examiner.*

T. M. BLIX, *Assistant Examiner.*